Patented June 5, 1928.

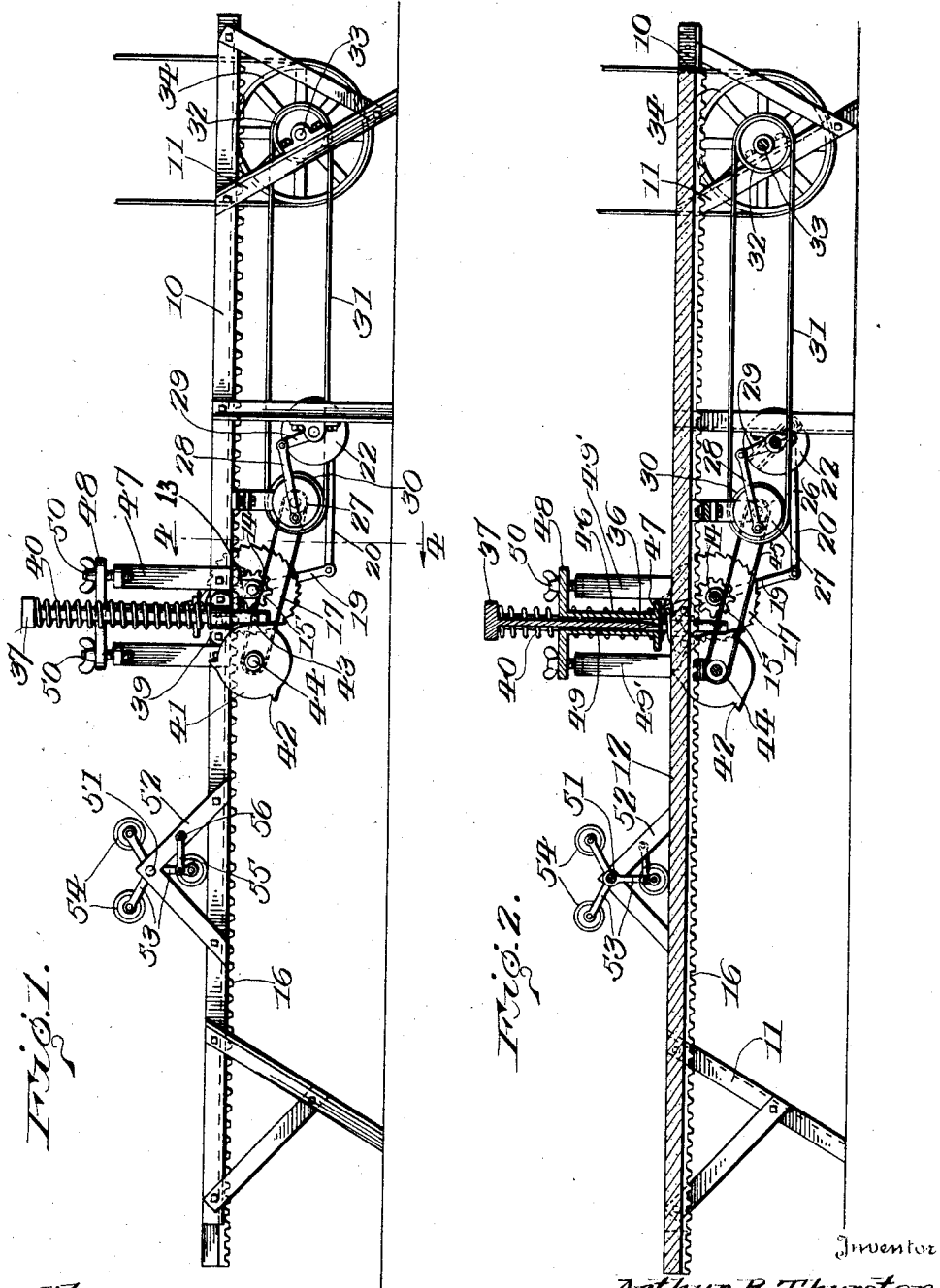

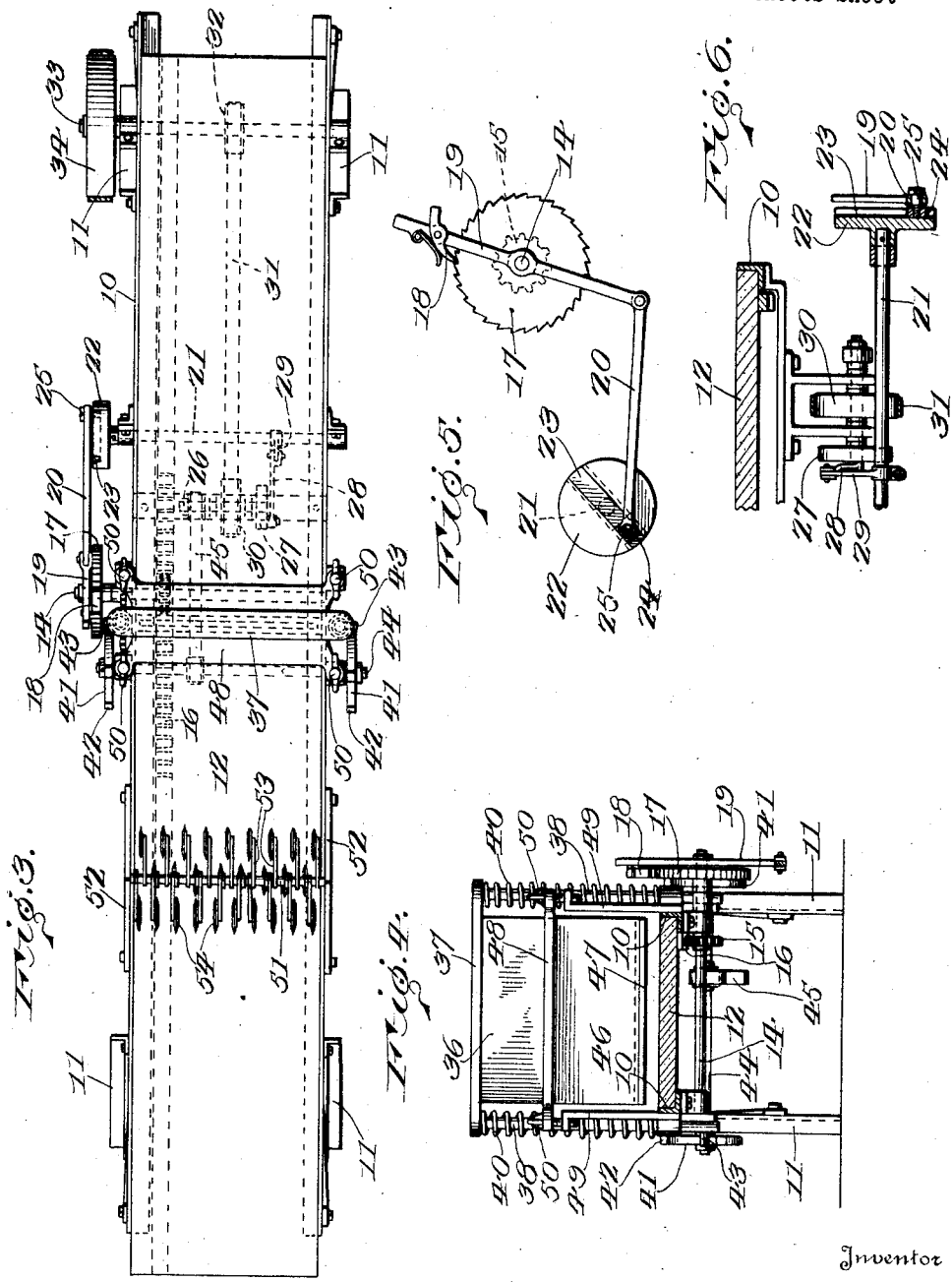

1,672,741

UNITED STATES PATENT OFFICE.

ARTHUR R. THURSTON, OF ST. JOSEPH, MISSOURI.

CANDY-CUTTING MACHINE.

Application filed June 23, 1921. Serial No. 479,870.

This invention relates to candy cutting machines, having for its primary object to provide a mechanism of simplified and improved construction for operating upon sheet candy to cut the sheet into strips of the desired length and breadth.

A further object of the invention is to provide a machine of the character stated which employs improved means for moving the candy supporting bed and for maintaining the bed stationary and against movement during the cutting operation, and which utilizes improved mechanism whereby the degree of travel of the bed may be varied as desired.

A further object of the invention is to provide improved cutting mechanism for operation upon the candy sheet, and by means of which the sheet is quickly cut throughout its width at the desired moment and which is equipped with means for preventing the knife becoming gummed with the sticky candy mass.

A still further object is to provide means of a novel nature for severing the candy strip lengthwise, and by the use of which the strips into which the sheet is cut lengthwise may readily be made narrower or broader as desired.

With these objects in view, together with others which will appear as the description proceeds, the invention resides in the novel construction, combination and arrangement of parts, all as will be described more fully hereinafter, illustrated in the drawings, and particularly pointed out in the claims.

In the drawings:

Figure 1 is a side elevation of a candy cutting machine constructed in accordance with the invention;

Fig. 2 is a longitudinal sectional view taken through the candy cutting machine;

Fig. 3 is a top plan view of the candy cutting machine;

Fig. 4 is a transverse sectional view taken substantially upon line 4—4 of Fig. 1;

Fig. 5 is a detail view of the mechanism by which the candy carrying table or bed is caused to travel intermittently; and Fig. 6 is a detail view of the means for operating the bed actuating mechanism.

Referring now more particularly to the drawings, 10 indicates a supporting frame for the movable candy carrying bed or table and the mechanism associated therewith; the said frame being of rectangular shape as shown, of any preferred length or breadth, and preferably being constructed of angle iron. This frame is maintained suitably spaced from the floor by legs or standards 11, as shown. To insure strength and rigidity of the frame, the longitudinal side rails thereof may be connected by suitable cross members or struts at various points throughout the length of the frame.

The bed or plate upon which the sheet candy is placed to be operated upon by the mechanism hereafter described is indicated at 12. This bed may be formed of any desired material, being of suitable length and of such width as to rest at its longitudinal edges in the angle bars constituting the longitudinal edges of the frame 10. The longitudinal angle bars of the said frame thus constitute guides or tracks for the support of the traveling bed. It will be understood that the bed will be constructed of such materials and in such manner as to prevent breakage or warping thereof in use; and may be equipped on its upper surface with a thin sheet of steel to insure evenness of surface, to facilitate the cutting operation to be hereafter described, and to enable the candy strips or bars to be readily removed therefrom after the cutting operation.

The longitudinal bars of the frame 10 are provided inwardly from the ends thereof with bearings 13 depending from their under surfaces and alined with each other laterally of the frame, the said bearings supporting the table or bed operating shaft 14. This shaft has affixed thereto a gear 15 engaged with teeth of a rack bar 16 carried by the under surface of the bed 12 and extending longitudinally thereof. It is obvious, therefore, that as shaft 14 rotates the bed 12 will be caused to slide longitudinally within the frame.

It is desired that this table be given an intermittent or step by step movement, the table being at rest during operation of the transverse cutting means to be hereafter detailed. To accomplish this step by step or intermittent travel of the table, a ratchet wheel 17 is affixed to shaft 14 and has its teeth engaged by a pawl 18 carried by a rock lever 19 pivoted concentrically with shaft 14. The lower end of rock lever 19 has secured thereto one end of an operating rod 20, the other end of which is operatively connected with a rock shaft 21 disposed transversely beneath frame 10. The rock shaft is equipped with a disk 22 having extending diametrically across one face thereof a dove-tail recess 23 to receive a head 24. The head 24 corresponds to the size and shape of recess 23 so as to be capable of sliding diametrically across the disk 22, and a set screw 25 passing through the head 24 enables the latter to be securely locked in its various positions of adjustment. The rod 20 is connected to head 24, and it is apparent that by adjusting the said head toward or away from the center of disk 22, the throw of the rock lever 19 may be controlled. By thus adjusting the throw of the said lever, it is apparent that the degree of movement of the table or bed 12 may be accurately governed, and the intervals in which the table will be moving or at rest may also be controlled.

The rock shaft 21 derives its movement from a jack shaft 26, the latter being mounted in any suitable manner beneath the frame 10, and this jack shaft carries a wheel or disk 27 to which is eccentrically connected one end of link 28. The opposite end of this link is connected to the outer end of an arm 29 affixed to shaft 21. The jack shaft 26 carries a belt or sprocket wheel 30, over which passes the belt or sprocket chain 31; the latter also passing over a belt or sprocket wheel 32 carried by the main power shaft 33 near one end of the frame 10. Shaft 33 may be energized in any desired manner, a belt wheel 34 being secured thereto in this instance to receive a belt or any other suitable power transmitting device connected with a line shaft (not shown).

The mechanism employed for transversely cutting the candy carried by the bed 12 includes a knife blade 36 of a length substantially equal to the breadth of the table; the said blade being secured to a head or bar 37 disposed transversely above the table. The head 37 has depending from the ends thereof the operating bars 38, these bars straddling the table and frame and being mounted for vertical reciprocation in bearings 39 affixed to the sides of the table. The knife is normally maintained in raised or inoperative position, springs 40 being utilized for this purpose. These springs encircle the bars or rods 38 and bear at their upper ends against head 37, resting at their lower ends either upon bearings 39 or against some other fixed part of the frame 10. It is obvious, therefore, that when the knife is moved downwardly into cutting position the springs 40 will be compressed, and when the knife is released these springs will cause the same to at once move upwardly to inoperative or non-cutting position.

The means employed for moving the knife downwardly includes a tooth wheel indicated at 41, the latter being provided with projections or teeth 42 at certain intervals in its circumference to move one at a time into contact with a pin 43 carried by bar 38. If desired, each of the bars 38 may be provided with an outwardly extending pin 43 to be engaged by the teeth 42 of wheels 41 disposed upon each side of the frame. By providing a pair of such wheels, it is apparent that evenness of movement of knife 36 is sure and the possibility of the same binding during operation is obviated. Any desired means may be employed for rotating the tooth wheel 41; the said wheels being affixed to a shaft 44 suitably mounted in bearings beneath the frame and driven from jack shaft 26 by means of a belt 45, as shown.

It will be understood, of course, that the tooth wheels 41 will operate upon the knife bars 38 so as to move the latter downwardly only when the table 12 carrying the candy sheet is at rest, and the knife operating mechanism and the bed controlling apparatus will be timed accordingly.

The knife 36 travels between a pair of guards 46 disposed transversely across and above the upper surface of table 12, the said guards having outwardly directed feet 47 lying close to the upper surface of the candy sheet carried by the table. The guards 46 depend from a plate 48 disposed a substantial distance above the table, and which is provided with a central slot 49 to receive knife blade 36. The plate 48 is supported at its ends upon standards or uprights 49 carried by the longitudinal bars of the frame 10, and set screws 50 connecting the plate ends with the said uprights enable the said plate to be adjusted vertically. This adjustment is provided to compensate for candy sheets of varying thicknesses. By providing guards 46 and feet 47, it is apparent that the candy will be prevented adhering to the knife after the cutting operation and when the knife is moving upwardly, as the candy sheet will be engaged by the said feet to obviate any lifting movement thereof.

The candy sheet is cut into longitudinal strips by means of roller knives carried by a shaft 51 disposed transversely above the table 12. This shaft is rotatably mounted at its ends in brackets 52 secured to the longitudinal side members of frame 10, and the said shaft is provided with rows of radiating arms 53 carrying roller cutters 54 at their outer ends. The length of the arms 53 is such that the roller knives 54 will cause incisions to be made in the candy sheet as the bed 12 moves longitudinally in its supporting frame. The arms of the several series carried by bar 51 may be spaced apart varying distances, in order that the knives of each series may be brought selectively into operative position to cut strips of varying widths. The end arm of each series of knives is provided with a stud or stem 55 to be engaged by a latch 56 carried by one of the brackets 52, the said latch maintaining the knives in proper cutting position.

In operation, the traveling table 12 is moved out toward the feed end of the frame and the candy sheet of the desired thickness is laid thereon. The machinery beneath the frame is energized, after the desired adjustments of knives and intermittent feed mechanism have been made. The table moves intermittently longitudinally of the frame, in the manner above described and through the instrumentality of the mechanism detailed, and the longitudinal and lateral cutting means operate upon the candy sheet in the manner specified. The table will remain stationary during the cutting operation of the laterally disposed knife 36, and as soon as this knife has been released, by passing of teeth 42 beyond and out of engagement with pins 43, the springs 40 will raise the knife to inoperative position, while at the same time the drive mechanism for the table comes into operation and moves the table a predetermined distance. This distance may be determined by adjusting the head 24 in the recess 23 disposed diametrically in disk 22, as has been before described. The knives 54 may be positioned upon the frame so as to cut the longitudinal incisions prior to the transverse cutting operation, or they may be positioned upon the frame so as to operate after the transverse cutting operation.

The foregoing is a description of the invention in its preferred embodiment. However, it will be understood that variations in the structural details and assemblage of the various parts may be resorted to without departing from the invention as defined by the claim.

What is claimed is:

A candy cutting machine including a support and a movable candy supporting bed thereon, uprights supported at opposite sides of the bed, a horizontal plate adjustable on the uprights and having a pair of depending parallel guide plates each provided with an outwardly directed horizontal flange on its lower edge, a knife blade disposed for vertical slidable movement between the guide plates and projecting above said plates, a transverse head on the upper end of the blade, posts secured to and depending from opposite ends of the head, coil springs encircling the posts and bearing against the head and the support, the lower end of each post having a projecting lug, a transverse shaft beneath the support, and a rotatable disk on each end of the shaft having regularly spaced lugs for successive engagement with the lugs of the posts for depressing the latter to bring the blade into cutting relation with the candy against the upward action of the coil springs.

In testimony whereof, I affix my signature.

ARTHUR R. THURSTON.